United States Patent [19]

Pan

[11] Patent Number: 5,182,450
[45] Date of Patent: Jan. 26, 1993

[54] HANDHELD IMAGE SCANNER WITH AUTOMATIC MOVEMENT CONTROL

[75] Inventor: Ampere Pan, Taipei, Taiwan

[73] Assignee: Primax Electronics Ltd., Taipei, Taiwan

[21] Appl. No.: 788,499

[22] Filed: Nov. 6, 1991

[51] Int. Cl.$^5$ .................... H01J 3/14; H04H 1/024
[52] U.S. Cl. ..................................... 250/234; 358/473
[58] Field of Search .................. 250/234, 208.1, 566, 250/239; 358/473; 382/59; 235/472

[56] References Cited

U.S. PATENT DOCUMENTS

| | | | |
|---|---|---|---|
| 4,438,459 | 3/1984 | Levine | 358/406 |
| 4,574,317 | 3/1986 | Scheible | 358/473 |
| 4,588,282 | 5/1986 | Levine | 358/300 |
| 4,703,186 | 10/1987 | Nakayama et al. | 250/566 |
| 4,797,544 | 1/1989 | Montgomery et al. | 250/221 |
| 4,819,083 | 4/1989 | Kawai et al. | 358/473 |
| 4,866,535 | 9/1989 | Kubota et al. | 382/59 |
| 4,893,189 | 1/1990 | Kubota et al. | 382/59 |
| 5,019,918 | 5/1991 | Kubota et al. | 358/473 |

Primary Examiner—David C. Nelms
Assistant Examiner—John R. Lee
Attorney, Agent, or Firm—Merchant, Gould, Smith, Edell, Welter & Schmidt

[57] ABSTRACT

A handheld image scanner is provided with a driving motor to permit manual or automatic transverse scanning movement. Stable and proper linear movement of the handheld image scanner is ensured when movement of the handheld image scanner is automatically controlled. The voltage supply to the driving motor can be adjusted so as to obtain the preferred scanning speed for a desired degree of resolution. The handheld image scanner is to be electrically connected to a computer which receives digital scan data from the image scanner. A transistor unit, which is connected in series to the driving motor, is controlled by the computer so as to interrupt current supply to the driving motor when the computer is not ready to receive additional scan data. Scanning is thus stopped and is resumed only when the computer is able to receive more scan data.

10 Claims, 7 Drawing Sheets

HANDHELD IMAGE SCANNER WITH AUTOMATIC MOVEMENT CONTROL

BACKGROUND OF THE INVENTION

1. Field of the Invention

The invention relates to a handheld image scanner, more particularly to a handheld image scanner, the scanning movement of which may be manually or automatically controlled.

2. Description of the Related Art

Figure 1:
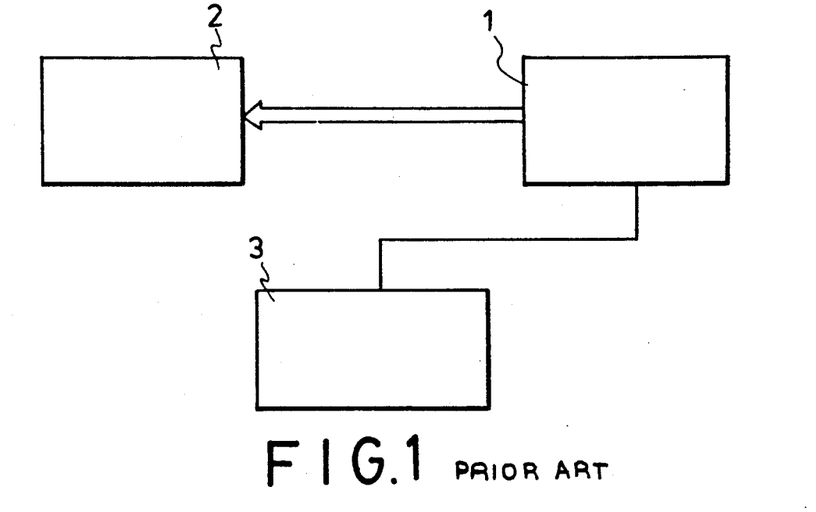
FIG. 1 is a block diagram illustrating an image scanner when in use.

FIG. 1 is a block diagram illustrating an image scanner when in use. Digital scan signals from the image scanner (3) are sent to a computer (2) via an interface device (1). The interface device (1) usually employs a direct memory access (DMA) method to receive the digital scan signals from the image scanner (3). Data from the interface device (1) is then received by the computer (2) for eventual display on a monitor device (not shown) or for eventual storage in a hard disk.

Figure 2:
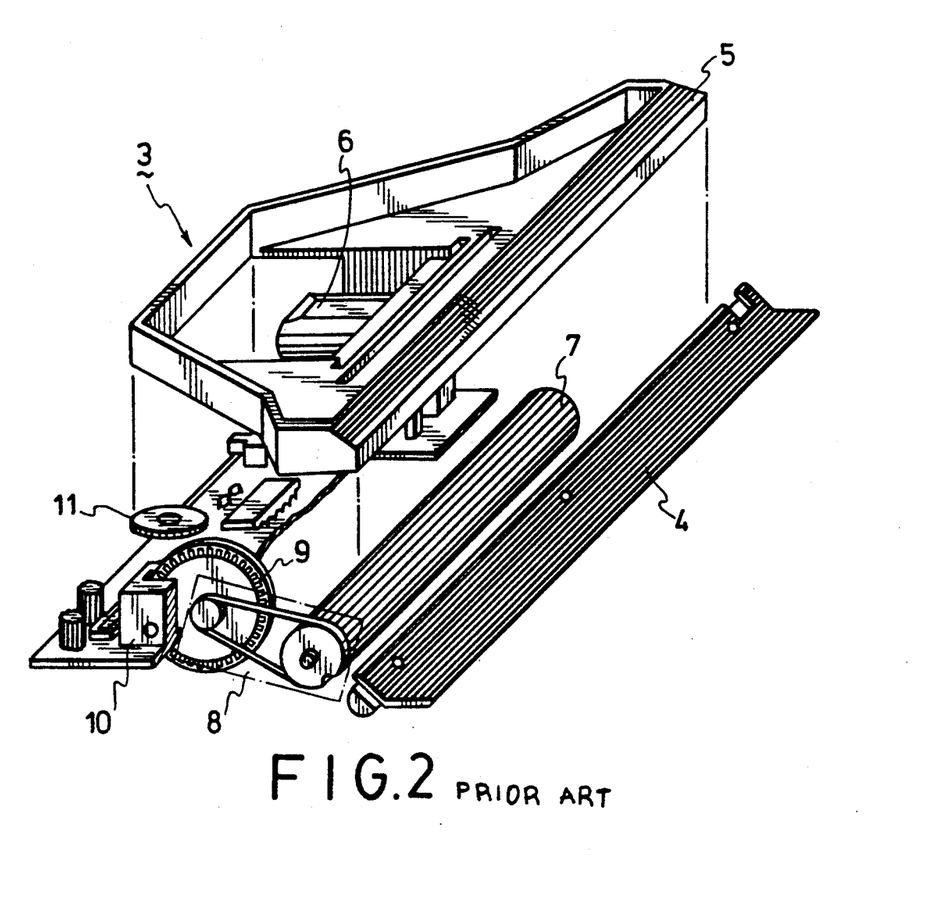
FIGS. 2 and 3 are partly exploded views of a conventional handheld image scanner.
Figure 3:
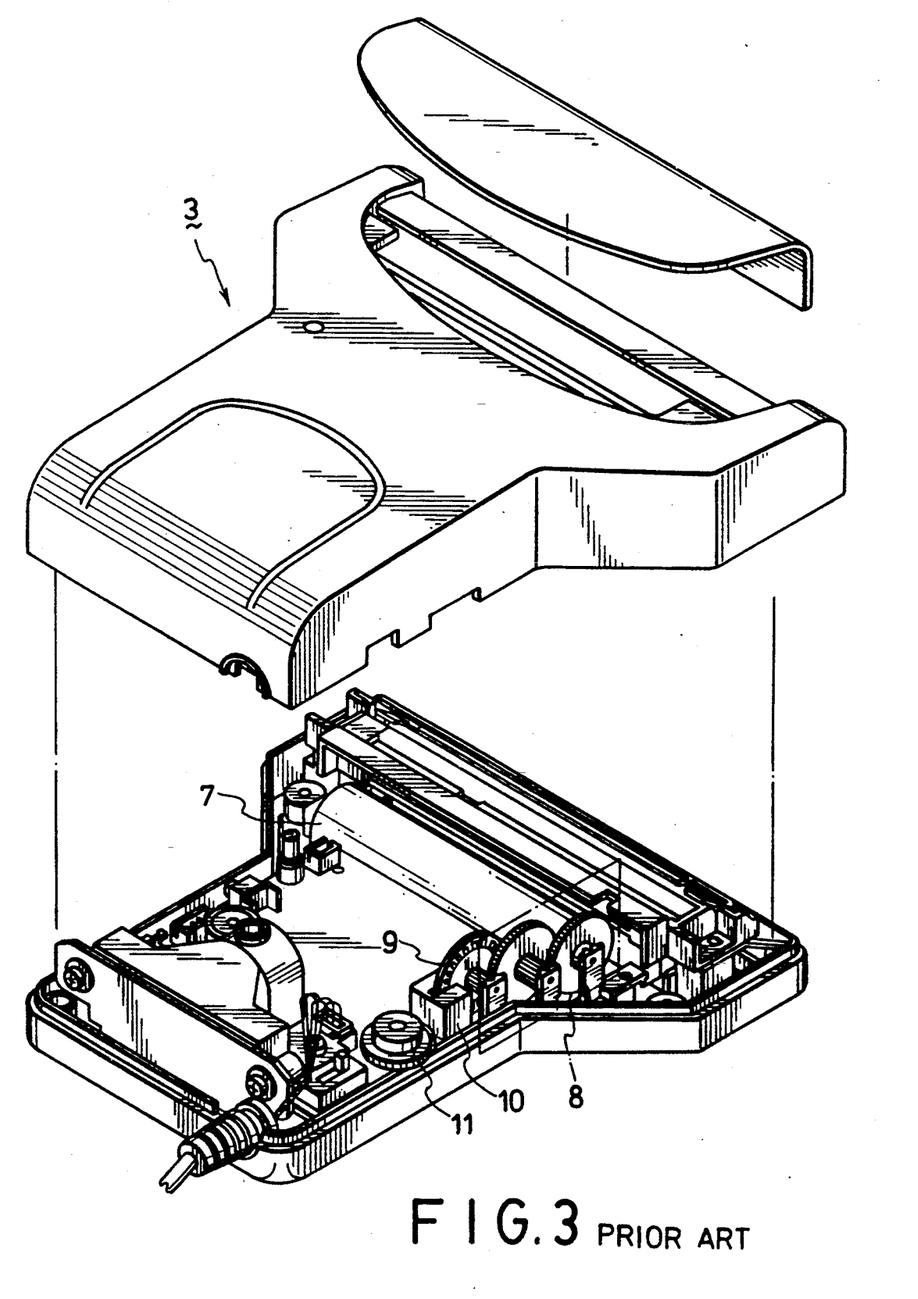

Referring to FIGS. 2 and 3, a conventional handheld image scanner (3) is shown to comprise: a light source (4) (such as a light emitting diode (LED) array or a cold cathode fluorescent tube); a horizontal line scanning means including a reflex (5) which is inclined at a 45° angle and a lens and image sensor (6); a transverse distance detecting means including a roller (7), a transmission means (8), and a signal generating means including a perforated rotary plate (9) and a photoemitter and sensing means (10); a brightness control knob (11); and the associated variable resistors, printed circuit board and housing.

When the conventional handheld image scanner (3) is in use, the light source (4) emits light so as to illuminate a portion of an image being scanned. Various light signals are generated according to the different tones on the image. The light signals are transmitted to the reflex mirror (5) inside the housing and are deflected towards the lens and image sensor (6) to thereby produce an electric signal which varies according to the intensity of light signal received. The image sensor has a plurality of light sensitive elements and is capable of scanning at resolutions greater than 200 dots per inch (dpi).

The image sensor can scan only one horizontal line of predetermined dimensions at one time. Thus, the handheld image scanner (3) must be moved in a transverse direction so as to scan the succeeding lines.

Figure 4:
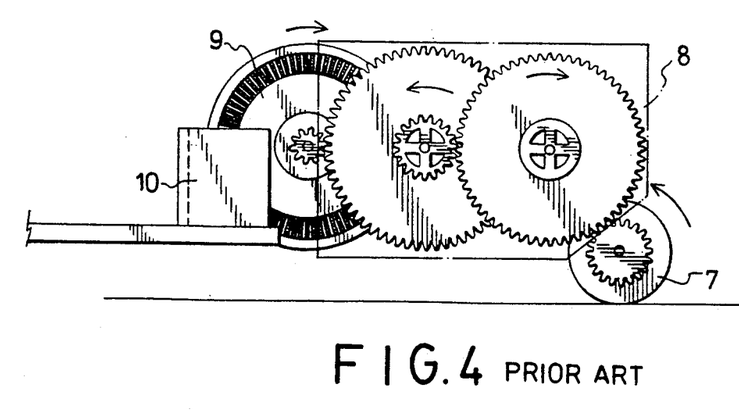
FIG. 4 illustrates the interaction of some of the components of the conventional handheld image scanner when in use.

Referring to FIG. 4, the roller (7) rolls along the surface of the image being scanned when moving the image scanner (3). Rotation of the roller (7) drives the transmission means (8) to correspondingly rotate the rotary plate (9). The rotary plate (9) is formed with a series of radially extending notches. The photoemitter and sensing means (10) includes a C-shaped seat, a light emitting means (not shown) mounted on an inner side of the C-shaped seat and a phototransistor (not shown) mounted opposite to the light emitting means. The rotary plate (9) extends into an opening in the C-shaped seat between the light emitting means and the phototransistor. The photoemitter and sensing means (10) can thus generate a series of ON/OFF signals whenever the rotary plate (9) is in motion. The ON/OFF signals are received by the computer (2) and are indicative of the distance traversed by the image scanner (3).

Manual movement of the conventional image scanner (3) in a transverse direction relative to the image has the following drawbacks:

1. Unsteady hand movement and slight inclined movement of the image scanner (3) can cause distortions in the resulting image transduced by the lens and image sensor (6).

2. Different degrees of resolution require different scanning speeds. A table of resolution (in dpi) versus the preferred scanning speed (in inch/sec) is shown below (Data is obtained under the condition of each line being exposed to light for a period of 3.57 milliseconds):

| Resolution | 100 | 200 | 300 | 400 | 600 | 800 |
|---|---|---|---|---|---|---|
| Scanning Speed | 2.8 | 1.4 | 0.93 | 0.7 | 0.46 | 0.35 |

It is difficult to obtain the preferred scanning speed for a desired degree of resolution when movement of the image scanner (3) is manually controlled. Note that high degrees of resolution require low scanning speeds. However, steady hand movement is difficult to attain at such low speeds. Furthermore, no useful information can be obtained when the hand moves at a speed much faster than the preferred scanning speed. 3. When a large volume of scan data is available, the memory capacity of the computer (2) is immediately filled and further scan data cannot be accommodated in the memory unit. Data in the memory unit should be first transferred to a hard disk so as to permit the computer (2) to receive additional scan data. However, since the manual scanning action is continuously performed, it is possible that some scan data will be lost while the computer (2) transfers data to the hard disk.

SUMMARY OF THE INVENTION

Therefore, the objective of the present invention is to provide an improved handheld image scanner, the movement of which can be automatically controlled so as to overcome the above-mentioned drawbacks commonly associated with the prior art.

More specifically, the main objective of the present invention is to provide a handheld image scanner, the movement of which can be automatically controlled so as to permit transverse movement of the same at the preferred scanning speed for a desired degree of resolution, and so as to obviate the adverse effects caused by unsteady hand movement.

Another objective of the present invention is to provide a handheld image scanner which stops scanning when the memory unit of a computer is full and which resumes scanning only when the memory unit is able to receive more data.

Accordingly, the preferred embodiment of a handheld image scanner of the present invention comprises: a housing; a light source mounted to a bottom side of the housing for emitting light to illuminate an image being scanned; a horizontal line scanning means provided inside the housing and including a transducer means to receive light signals which correspond to an illuminated horizontal line portion of the image, the transducer means generating an electric signal which varies according to the intensity of light signals received; a transverse distance detecting means including a roller means which rolls along the surface of the image when the image scanner is moved in a direction transverse to the illuminated horizontal line portion, a transmission means provided inside the housing and capable of being rotatably driven by the roller means, and a signal generating means activated by the transmission means so as to generate a series of ON/OFF signals which are indicative of the transverse distance traversed by the image scanner; and a driving unit having a motor means with an output shaft, the driving unit being capable of rotatably driving the transmission means so as to rotate the roller means and automatically move the image scanner in the direction transverse to the illuminated horizontal line portion. The driving unit further comprises a selective engaging means including a driving sprocket mounted to the output shaft of the motor means and selectively engaging the transmission means so as to transmit movement of the motor means to the roller means.

The handheld image scanner further comprises a voltage divider circuit means having a plurality of output ports each having a distinct voltage signal output, and a resolution select switch to connect the motor means to a selected one of the output ports so as to obtain the proper scanning speed for a desired degree of resolution.

The handheld image scanner is to be connected to a control circuitry so as to transmit the electrical signal from the transducer means thereto. A transistor means is connected in series to the motor means and is controlled by the control circuitry so as to interrupt current supply to the motor means when the control circuitry is not ready to receive the electrical signal.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 5:
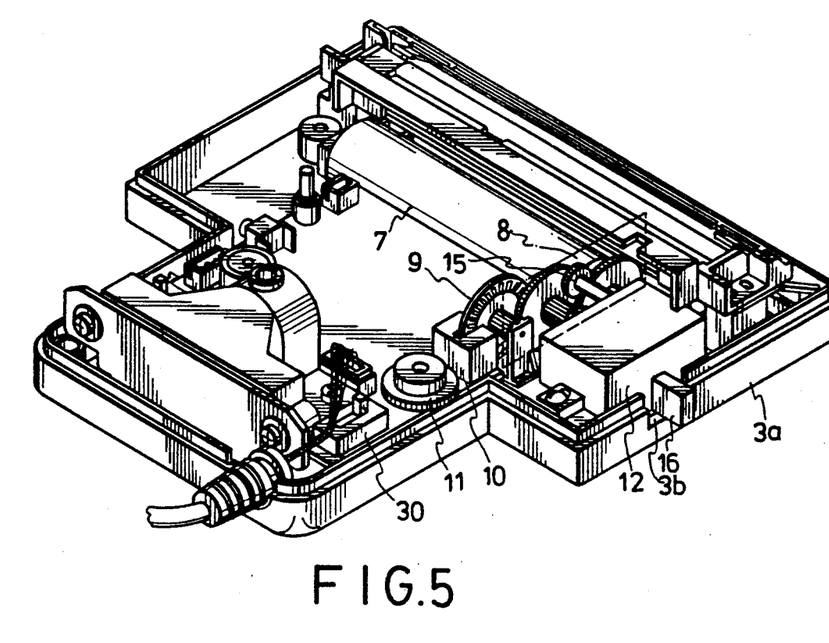
FIG. 5 is a perspective view of the first preferred embodiment of a handheld image scanner according to the present invention.
Figure 6:
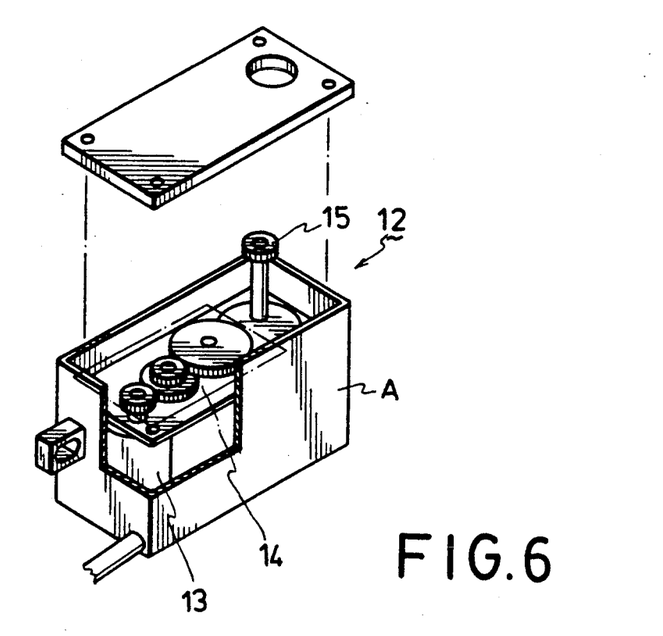
FIG. 6 is an illustration of a driving unit of the first preferred embodiment.
Figure 7:
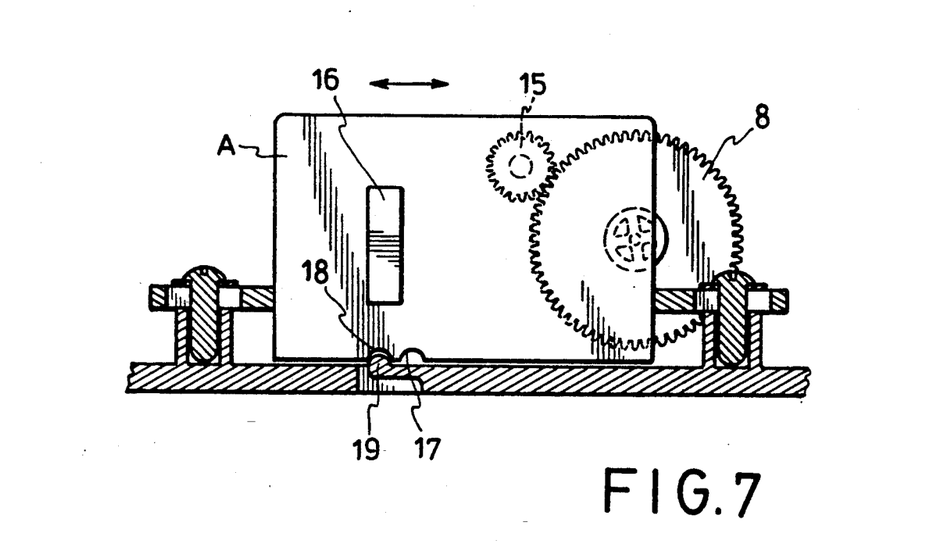
FIG. 7 illustrates the interaction of the driving unit shown in FIG. 6 with a transmission means of the first preferred embodiment.

Referring to FIG. 5, the first preferred embodiment of a handheld image scanner according to the present invention is shown to be substantially similar to the conventional handheld image scanner shown in FIGS. 2 and 3. The first preferred embodiment, however, further comprises a driving unit (12) provided inside the housing (3a) of the image scanner. Referring to FIG. 6, the driving unit (12) includes a motor means with a motor (13) and a speed reducing gear mechanism (14) driven by the motor (13). The driving unit (12) further includes a selective engaging means having a casing (A) to confine the motor (13) and the gear mechanism (14), and a driving sprocket (15) mounted to an output shaft of the speed reducing gear mechanism (14) and extending out of the casing (A). Referring to FIG. 7, the sprocket (15) can engage the transmission means (8) so as to rotatably drive the same and to permit automatic movement control of the first preferred embodiment. Manual movement control of the first preferred embodiment is still permissible by disengaging the sprocket (15) from the transmission means (8), as will be detailed in the succeeding paragraphs.

Referring to FIGS. 5 and 7, the casing (A) is provided with a tab projection (16) which extends through a notch (3b) in the surrounding wall of the housing (3a). The tab projection (16) is movable between two sides of the notch (3b). The bottom side of the casing (A) is provided with a pair of concave grooves (17, 18). The bottom wall of the housing (3a) is provided with a flexible projection (19) which is adapted to releasably engage a selected one of the concave grooves (17, 18).

When the tab projection (16) is moved rearward, the casing (A) correspondingly moves rearward to disengage the sprocket (15) from the transmission means (8). The projection (19) engages the groove (17) to retain the casing (A) in this position. Movement of the image scanner is accomplished manually.

When the tab projection (16) is moved forward, the casing (A) correspondingly moves forward to engage the sprocket (15) and the transmission means (8). The projection (19) engages the groove (18) to retain the casing (A) in this position. Operation of the motor (13) correspondingly rotates the transmission means (8), thus permitting stable and proper linear movement of the image scanner along the surface of the image being scanned.

In the first preferred embodiment, the transition from manual movement control to automatic movement control and vice versa is achieved by manually operating the tab projection (16). In the second preferred embodiment of a handheld image scanner according to the present invention, such a transition is achieved via a movable gear means (20).

Figure 8:
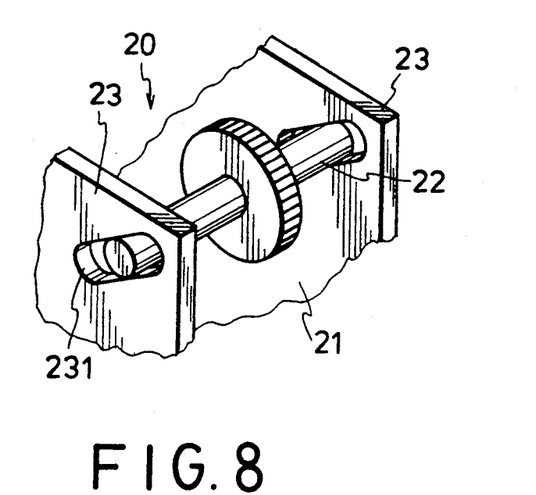
FIG. 8 is a perspective view of a movable gear means of the second preferred embodiment of a handheld image scanner according to the present invention.
Figure 9:
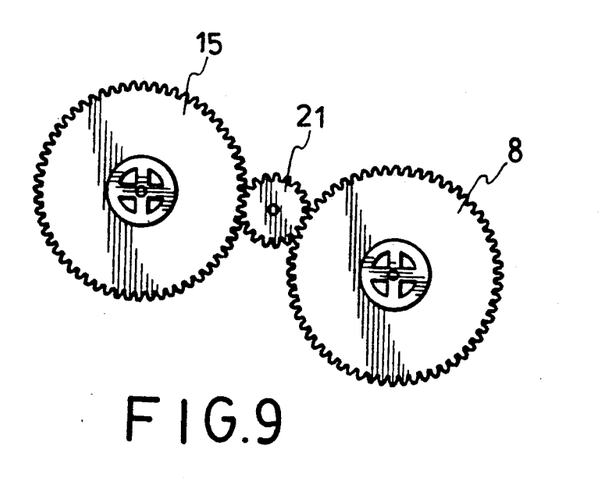
FIG. 9 illustrates the interaction of a gear wheel of the movable gear means shown in FIG. 8 with the other components of the handheld image scanner of the present invention.

Referring to FIGS. 8 and 9, the movable gear means (20) includes a gear wheel (21) mounted on an axle (22) and a pair of spaced guide plates (23) provided with aligned, upwardly inclining rail grooves (231). The two ends of the axle (22) extend through and are movable along the rail grooves (231). The gear wheel (21) is movably provided between the sprocket (15) and the transmission means (8) so as to engage and disengage the same.

Figure 10A:
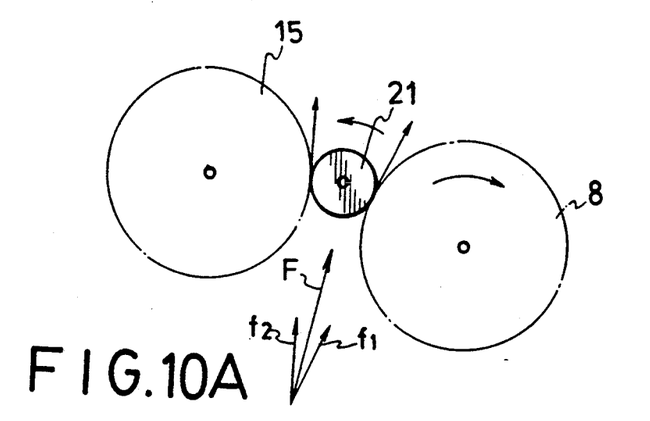
FIG. 10A is a force diagram illustrating the forces acting on the gear wheel shown in FIG. 9 when movement of the second preferred embodiment is manually controlled.

When movement of the image scanner is accomplished manually, the roller (7) (refer to FIG. 5) rolls along the surface of the image being scanned and correspondingly drives the transmission means (8) to rotate in a clockwise direction. The gear wheel (21) is driven by the transmission means (8) so as to rotate in a counterclockwise direction. The driving unit (12) is shut off, and the sprocket (15) is in a static state since manual control is desired. Referring to the force diagram shown in FIG. 10A, a driving force (f1) is induced at the contact point of the gear wheel (21) and the transmission means (8), while a retarding force (f2) is induced at the contact point of the gear wheel (21) and the sprocket (15). The resultant force (F) of the two forces (f1, f2) is oriented in an upwardly inclining direction, thereby urging the axle (22) to move upward along the rail grooves (231) (refer to FIG. 9) to separate the linkage between the transmission means (8) and the sprocket (15). This illustrates how the driving unit (12) does not affect the transmission means (8) when movement of the image scanner is manually controlled. When manual movement of the image scanner is ceased, the axle (22) moves downward along the rail grooves (231) to place the gear wheel (21) in its original position.

Figure 10B:
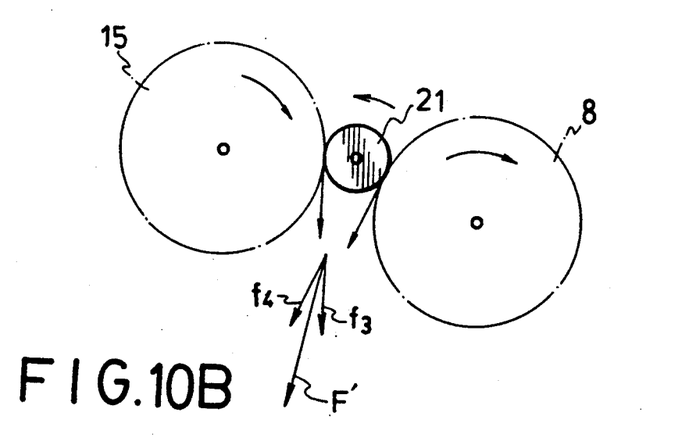
FIG. 10B is a force diagram illustrating the forces acting on the gear wheel shown in FIG. 9 when movement of the second preferred embodiment is automatically controlled.

When movement of the image scanner is accomplished automatically, the driving unit (12) is turned on, and the sprocket (15) rotates in a clockwise direction and correspondingly drives the gear wheel (21) to rotate in a counterclockwise direction. The gear wheel (21) then drives the transmission means (8) to rotate in a clockwise direction to permit rolling movement of the roller (7) along the surface of the image being scanned. Referring to the force diagram shown in FIG. 10B, a driving force (f3) is induced at the contact point of the gear wheel (21) and the sprocket (15), while a retarding force (f4) is induced at the contact point of the gear wheel (21) and the transmission means (8). The resultant force (F') of the two forces (f3, f4) is oriented in a downwardly inclining direction, thereby urging the axle (22) to move downward along the rail grooves (231) to ensure tight engagement between the gear wheel (21), the sprocket (15) and the transmission means (8).

It has been shown from the foregoing discussion that the driving unit (12) does not affect the transmission means (8) when movement of the image scanner is manually controlled. Referring to FIG. 5, when movement of the image scanner is automatically controlled, the motor (13) drives the sprocket (15) to correspondingly rotate the transmission means (8), the roller (7) and the rotary plate (9). As with the conventional handheld image scanner, the photoemitter and sensing means (10) generates a series of ON/OFF signals whenever the rotary plate (9) is in motion. The ON/OFF signals are received by the computer (2) and are indicative of the distance traversed by the image scanner (3).

Figure 11:
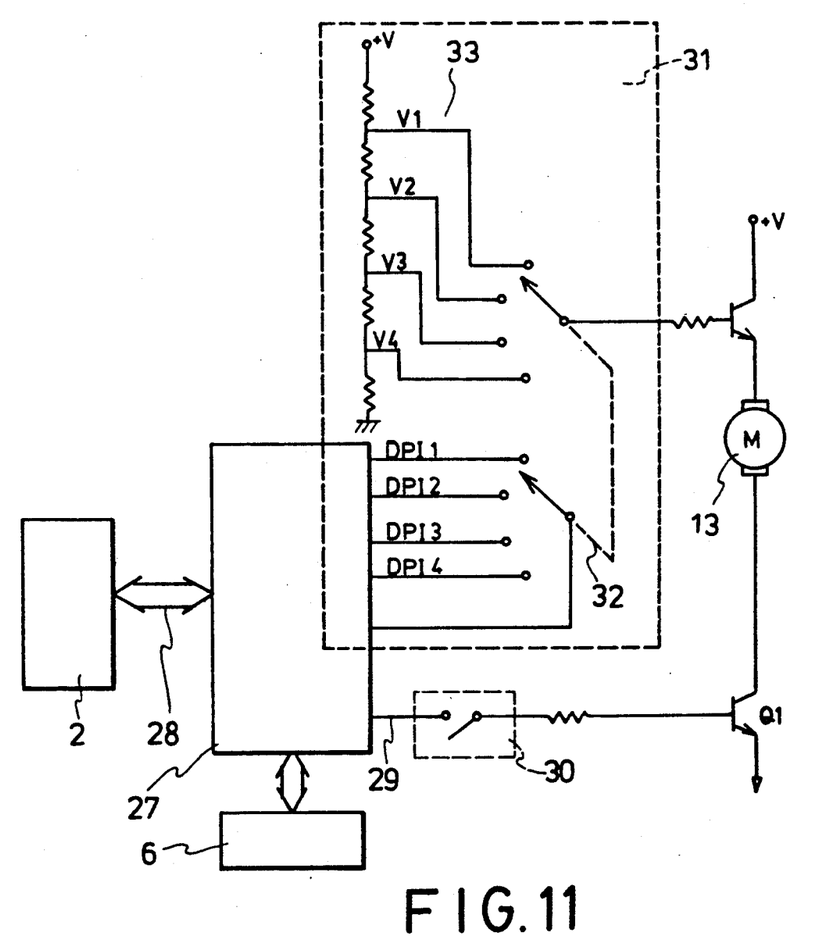
FIG. 11 is a schematic circuit diagram of the image scanner of the present invention.

A schematic circuit diagram of the handheld image scanner of the present invention is shown in FIG. 11. The handheld image scanner has an internal control circuitry (27) which is connected to a computer (2) via a data bus (28). The image sensor (6) is similarly wired to the control circuitry (27). The control circuitry (27) has a motor control line (29) which is connected to a motor ON/OFF control switch (30). The control switch (30) is placed in the OFF position when manual movement of the image scanner is desired, and in the ON position if otherwise. A resolution select circuit (31) includes a voltage divider circuit means (33) having a plurality of output ports with distinct voltage signal outputs (V1, V2, V3, V4), and a double pole switch (32) which is used to select one of four resolution control lines of the control circuitry (27). Each of the resolution control lines preferably corresponds to one of the following degrees of resolutions: 100, 200, 300, and 400 dpi. The double pole switch (32) is also operated to connect the motor (13) to one of the output ports of the voltage divider circuit means (33) to vary its speed.

When movement of the handheld image scanner is automatically controlled, the control switch (30) is first placed in the ON position, and the switch (32) is operated to select the desired degree of resolution. At the same time, the switch (32) connects the motor (13) to one of the output ports of the voltage divider circuit means (33) to provide to the motor (13) the required operating voltage corresponding to the desired degree of resolution. This illustrates how the preferred scanning speed for a desired degree of resolution can be obtained when automatically moving the image scanner.

The computer (2) sends an interrupt signal to the control circuitry (27) when the memory unit of the computer (2) is filled with scan data. The control circuitry (27) responds by generating a voltage signal at the control line (29) to cut-off a transistor (Q1) which is in series with the motor (13), thereby interrupting current supply to the motor (13) and stopping the operation of the same. The computer (2) generates a ready signal to the control circuitry (27) once data in the memory unit has been transferred to a hard disk (not shown). The control circuitry (27) then operates the transistor (Q1) in the conducting state, and the motor (13) is again in operation. The possibility of losing some scan data has thus been minimized.

The advantages of using the handheld image scanner according to the present invention are as follows:

1. Manual or automatic movement control of the handheld image scanner is possible.
2. Stable and proper linear movement of the handheld image scanner is ensured when movement of the image scanner is automatically controlled, thereby minimizing the occurrence of distortions in the resulting image transduced by the lens and image sensor.
3. The required scanning speed for a desired degree of resolution can be obtained when movement of the image scanner is automatically controlled.
4. Scanning is temporarily stopped when the memory unit of the computer is filled and is continued only when the computer is again ready to receive additional data. The possibility of losing some scan data has thus been minimized.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. A handheld image scanner, comprising:
    a housing;
    a light source mounted to a bottom side of said housing for emitting light to illuminate an image being scanned;
    a horizontal line scanning means provided inside said housing and including a transducer means to receive light signals which correspond to an illuminated horizontal line portion of the image, said transducer means generating an electric signal which varies according to the intensity of light signals received;

a transverse distance detecting means including a roller means which rolls along the surface of the image when said image scanner is moved in a direction transverse to the illuminated horizontal line portion, a transmission means provided inside said housing and capable of being rotatably driven by said roller means, and a signal generating means activated by said transmission means so as to generate a series of ON/OFF signals which are indicative of the transverse distance traversed by said image scanner; and a driving unit having a motor means with an output shaft, said driving unit being capable of rotatably driving said transmission means so as to rotate said roller means and automatically move said image scanner in the direction transverse to the illuminated horizontal line portion, said driving unit being selectively engageable with said transmission means.

2. The handheld image scanner as claimed in claim 1, wherein said driving unit further comprises a selective engaging means including a driving sprocket mounted to said output shaft of said motor means and selectively engaging said transmission means so as to transmit movement of said motor means to said roller means.

3. The handheld image scanner as claimed in claim 2, wherein said selective engaging means further comprises a casing to house said motor means, said casing having a tab projection being manually operated so as to selectively move said casing to correspondingly move said driving sprocket to engage or disengage said transmission means.

4. The handheld image scanner as claimed in claim 3, wherein said housing includes a bottom wall and a surrounding wall extending from said bottom wall and being provided with a notch; said casing being provided inside said housing; said tab projection extending through said notch; said casing having a bottom side provided with a pair of concave grooves; said bottom wall of said housing being provided with a flexible projection which is adapted to releasably engage one of said concave grooves so as to maintain said driving sprocket in a first portion, wherein said driving sprocket is remote from and disengages said transmission means, or in a second position, wherein said driving sprocket engages said transmission means.

5. The handheld image scanner as claimed in claim 2, wherein said selective engaging means further comprises a movable gear means including a axle, a gear wheel mounted on said axle, and a pair of spaced guide plates provided with aligned, upwardly inclining rail grooves; said axle having two ends which extend through and are movable along said rail grooves; said gear wheel being movably provided between said driving sprocket and said transmission means so as to transmit movement of said driving sprocket to said transmission means when said motor means is activated and to disengage said driving sprocket from said transmission means when movement of said image scanner is manually controlled.

6. The handheld image scanner as claimed in claim 1, further comprising a voltage divider circuit means having a plurality of output ports each having a distinct voltage signal output, and a resolution select switch to connect said motor means to a selected one of said output ports so as to obtain the proper scanning speed for a desired degree of resolution.

7. The handheld image scanner as claimed in claim 6, wherein said handheld image scanner includes a control circuitry which is connected to a computer system so as to transmit said electrical signal from said transducer means thereto, said handheld image scanner further comprises a transistor means being connected in series to said motor means and being controlled by the control circuitry so as to interrupt current supply to said motor means when the control circuitry is not ready to receive the electrical signal.

8. A handheld image scanner, comprising:

a housing;

a light source mounted to a bottom side of said housing for emitting light to illuminate an image being scanned;

a horizontal line scanning means provided inside said housing and including a transducer means to receive light signals which correspond to an illuminated horizontal line portion of the image, said transducer means generating an electric signal which varies according to the intensity of light signals received;

a transverse distance detecting means including a roller means which rolls along the surface of the image when said image scanner is moved in a direction transverse to the illuminated horizontal line portion, a transmission means provided inside said housing and capable of being rotatably driven by said roller means, and a signal generating means activated by said transmission means so as to generate a series of ON/OFF signals which are indicative of the transverse distance traversed by said image scanner; and a driving unit having a motor means with an output shaft, and a selective engaging means including a driving sprocket mounted to said output shaft of said motor means and selectively engaging said transmission means, said driving unit being capable of rotatably driving said transmission means so as to rotate said roller means and automatically move said image scanner in the direction transverse to the illuminated horizontal line portion.

9. A handheld image scanner, comprising:

a housing;

a light source mounted to a bottom side of said housing for emitting light to illuminate an image being scanned;

a horizontal line scanning means provided inside said housing and including a transducer means to receive light signals which correspond to an illuminated horizontal line portion of the image, said transducer means generating an electric signal which varies according to the intensity of light signals received;

a transverse distance detecting means including a roller means which rolls along the surface of the image when said image scanner is moved in a direction transverse to the illuminated horizontal line portion, a transmission means provided inside said housing and capable of being rotatably driven by said roller means, and a signal generating means activated by said transmission means so as to generate a series of ON/OFF signals which are indicative of the transverse distance traversed by said image scanner;

a driving unit having a motor means with an output shaft, said driving unit being capable of rotatably driving said transmission means so as to rotate said roller means and automatically move said image scanner in the direction transverse to the illuminated horizontal line portion; and a voltage divider circuit means having a plurality of output ports each having a distinct voltage signal output, and a resolution select switch to connect said motor means to a selected one of said output ports so as to obtain the proper scanning speed for a desired degree of resolution.

10. A handheld image scanner, comprising:

a housing;

a light source mounted to a bottom side of said housing for emitting light to illuminate an image being scanned;

a horizontal line scanning means provided inside said housing and including a transducer means to receive light signals which correspond to an illuminated horizontal line portion of the image, said transducer means generating an electric signal which varies according to the intensity of light signals received;

a transverse distance detecting means including a roller means which rolls along the surface of the image when said image scanner is moved in a direction transverse to the illuminated horizontal line portion, a transmission means provided inside said housing and capable of being rotatably driven by said roller means, and a signal generating means activated by said transmission means so as to generate a series of ON/OFF signals which are indicative of the transverse distance traversed by said image scanner;

a driving unit having a motor means with an output shaft, said driving unit being capable of rotatably driving said transmission means so as to rotate said roller means and automatically move said image scanner in the direction transverse to the illuminated horizontal line portion; and a control circuitry which is connected to a computer system so as to transmit said electrical signal from said transducer means thereto, said handheld image scanner further comprises a transistor means being connected in series to said motor means and being controlled by the control circuitry so as to interrupt current supply to said motor means when the control circuitry is not ready to receive the electrical signal.

* * * * *